June 5, 1956 M. L. LIPSICH ET AL 2,748,690
COOKING DEVICE
Original Filed April 7, 1951 2 Sheets-Sheet 1
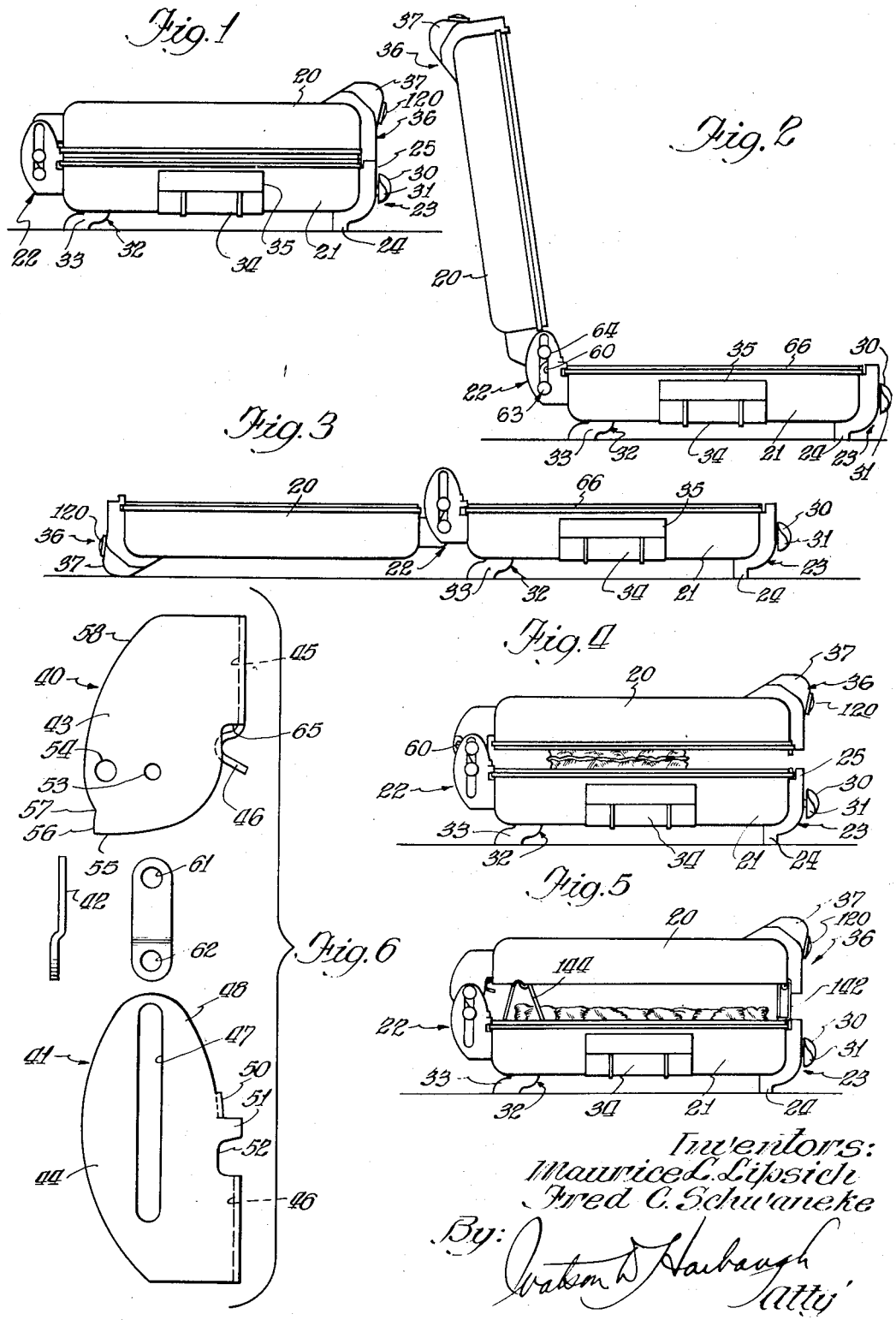
Inventors:
Maurice L. Lipsich
Fred C. Schwaneke
By: Watson D. Harbaugh
Atty.

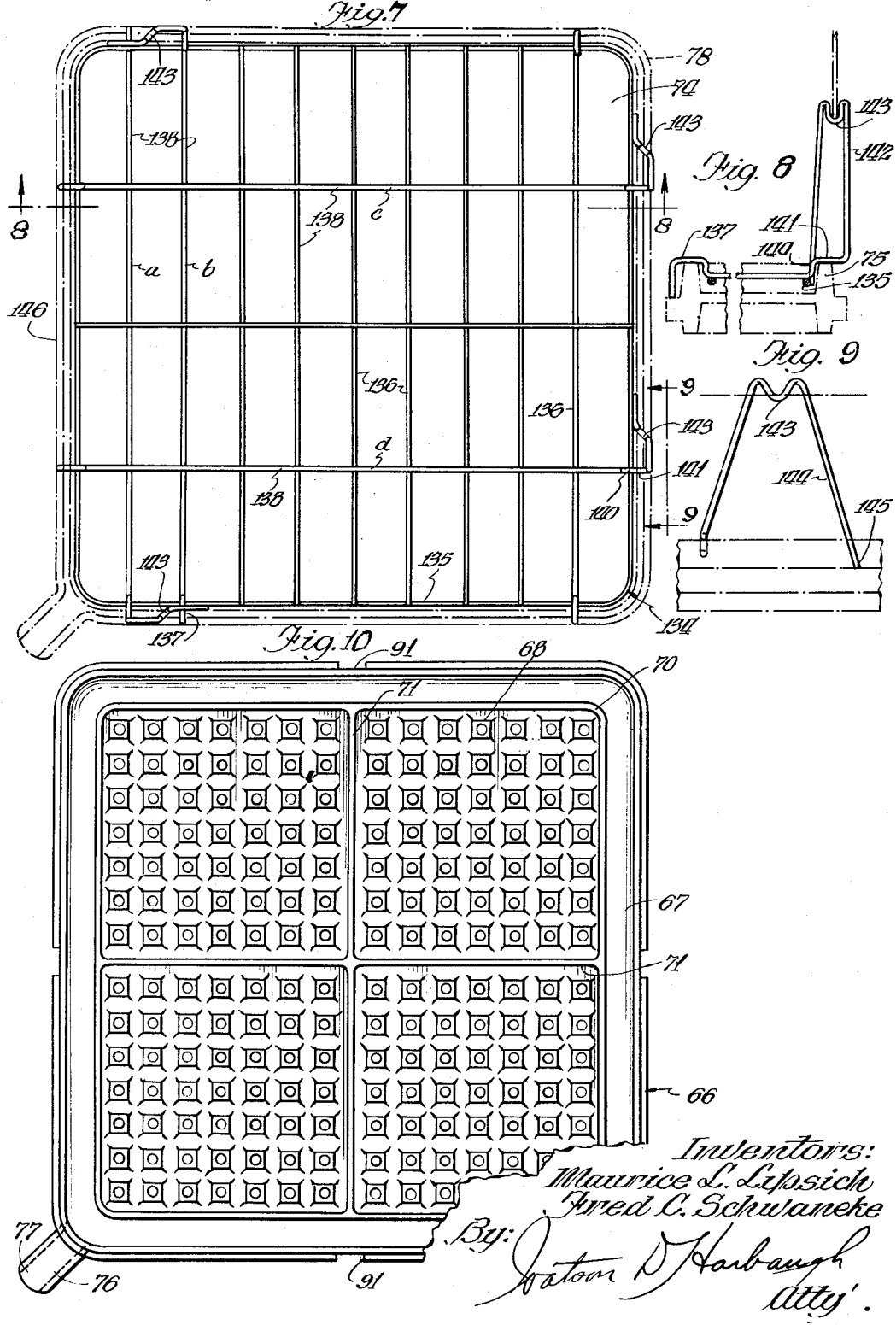

United States Patent Office 2,748,690
Patented June 5, 1956

2,748,690

COOKING DEVICE

Maurice L. Lipsich and Fred C. Schwaneke, Chicago, Ill., assignors to Dormeyer Corporation, Chicago, Ill., a corporation of Illinois Original application April 7, 1951, Serial No. 219,796, now Patent No. 2,710,906, dated June 14, 1955. Divided and this application November 1, 1952, Serial No. 318,467

7 Claims. (Cl. 99—340)

The present invention relates to a food cooker and more particularly to an electric device for making waffles, grilling sandwiches and broiling steaks and the like.

This application is a division of applicants' co-pending application Serial No. 219,796 filed April 7, 1951 now Patent No. 2,710,906.

One of the objects of the invention is to provide an electrical cooking device which will bake, grill and broil various foods with equal facility and with little if any inconvenience to the user in doing these various operations in succession.

A further object of the invention is to provide an improved construction which will accommodate food requiring a different spacing between two cooperating cooking elements over a wide range and will permit the positioning of the elements in any one of three different positions angularly with respect to each other for access and use.

A further object of the invention is to provide a device of the class described which is easy to operate, single and inexpensive to manufacture and maintain yet rugged enough to withstand abuse and lack of care.

These being among the objects of the invention other and further objects will appear from the drawings, the description relating thereto and the appended claims.

Referring now to the drawings:

Fig. 1 is a side elevation of a combination waffle, grill and broiler cooking device embodying the invention with the upper and lower heating units located in their closed or waffle baking position.

Fig. 2 is a side elevation of the device shown in Fig. 1 with the top unit raised either for removing a baked waffle, or pouring in batter for a waffle to be baked, or for receiving a sandwich to be grilled.

Fig. 3 is a side elevation of the device shown in Figs. 1 and 2 with the top unit moved 180° from its closed position to a position in which it is supported in the same plane with the lower unit as when the upper and lower units are to be used independently as hot plates, griddles, or heaters.

Fig. 4 is a view similar to Fig. 1 in which the upper and lower units cooperate to grill a sandwich as when the upper unit is supported above the lower unit by the sandwich itself.

Fig. 5 is view similar to Fig. 1 in which the upper unit is supported on a wire rack well above the lower unit for broiling purposes with the upper grid removed.

Fig. 6 is a view of the parts making up the hinge embodied in the invention.

Fig. 7 is a plan view of the lower unit with the plate mounted in grill position and the novel wire rack in place when it is used for broiling.

Fig. 8 is a fragmentary sectional view taken on the line 8—8 of Fig. 7.

Fig. 9 is a side elevation taken at the line 9—9 on Fig. 7.

Fig. 10 is a plan view showing the waffle side of the plate.

The invention is characterized by novel hinge, switch and heater constructions and arrangement whereby the upper grill member operates to grill, bake and broil with the same heating elements in a device which operates also as a waffle baker upon occasion.

In one instance, the upper and lower units cooperate as a waffle maker as determined by the hinge relationship when the switch is set at a predetermined position. In this relationship the upper grill is limited in its pivoted movement to approximately 100° from horizontal to 10° past vertical for access in applying the batter and removing the waffle. Reversal of the grill plates permits the device to serve as a sandwich grill. In both instances the cooking operation is thermostatically controlled and the weight of the upper unit is in part carried by and shapes or flattens the food being prepared.

When one desires to use the device as a hot plate, the upper member is raised to its upper limit and lifted a small fraction of an inch to clear the hinge stops whereupon the upper member can be moved further and laid flat to occupy the same plane as that of the lower member.

In this position the upper element can also be used as a hot plate either with the grid element present or removed. If removed, other special cooking elements like pressure cookers, deep fat fryers and toasters can be set upon or attached to the upper element with the heater coil supporting insulators serving as a spider. On the other hand, if the grid element is left in place other cooking utensils can be set upon it as though upon a stove top.

For broiling meats or toasting bread the grid on the upper member is removed and a novel wire rack is placed upon the lower grid to carry the meat or bread slices. Upstanding loops on the wire rack engage the upper housing when it is lowered and support it well above the food as accommodated by the hinge. In this instance only the upper heating unit is employed to accomplish the broiling or toasting operation and the heat output there is much higher than that dispensed for waffle making or grilling.

Referring to the drawings in further detail a cooking device is shown in Fig. 1 which has upper and lower die stamped housing or shells, 20 and 21 respectively, hinged together by a hinge represented generally at 22. At the front of the lower member 21 is secured an element 23 which has a foot 24 and a panel 25 (Fig. 1) which includes a pointer 30 and a handle 31 for a control switch (not shown).

At the rear of the housing 21 there are provided feet 32 which are secured in place in any suitable manner and are provided with rearwardly offset extremities 33 which prevent tipping of the device when the top member is raised as shown in Fig. 2. On both sides of the lower housing 4 are secured handles 34, having horizontal portions 35 made of a material of low heat conductivity so that a user's fingers will not be burned when lifting or moving the device.

At the front of the upper housing 20 is secured an element 36, matching element 23 in style and design, with a central upstanding ear 37 serving three purposes, namely, as a handle for raising and lowering the element; as a leg when the top member is moved to the position shown in Fig. 3; and, as a housing for the tell-tale light so that it can be seen in any position to which the upper housing may be moved. The height of the handle above the top of the upper member is the same as the height of the legs 24 below the lower member so that both of the two elements are level and also level with each other.

The hinge 22 comprises two main units (Fig. 6), an upper unit 40 and a lower unit 41, two connecting links 42 and pins as hereinafter described. Both units are preferably made of heavy sheet metal and stamped to have two symmetrically arranged end portions shaped as shown at 43 and 44, which end portions are connected by band portions 45 and 46, respectively. The units are secured to the respective top and bottom housings 20 and 21 along their band portions by being riveted to the back sidewall of the respective shells. It is preferred that adjacent edges of the two bands be flush or coincide with the adjacent edges of the two shells. Two frontwardly opening hook-like ears 46 are struck from the upper band 45 to extend below the lower edge of the upper shell 20 as more particularly seen in Fig. 5 where it serves to locate and secure the waffle plate as later described.

The lower end sections 44 have a long vertical slot 47 centrally therein and two ears on its front edge 48. The upper ear 50 is bent to occupy a plane parallel to the band 46 whereas the lower ear 51 serves as the upper boundary of a notch 52 which receives and secures in place the grid on the lower housing 21 as later described. The edges of the lower end sections 44 are otherwise rounded to an oval form.

The upper end section 43 has two horizontally spaced holes 53 and 54 in the lower portion thereof, and the lower front edge of the upper section is curved on a radius having the hole 53 in the center. At the rear edge the curve straightens out to provide a stop at 55, directly below the hole 54. Contiguous to, above and at approximately right angles to the stop 55 is a slightly rounding cam surface 56 whose upper end forms an appreciable recess at 57 is conjunction with the remaining rear edge portion 58, which edge portion thereabove follows the oval contour of the lower end section 41 over this area.

The link 42 is offset intermediate its ends to provide appropriate clearances and is pivotally connected at its upper end to the upper member by a pin 60. The pin is received in the opening 54 in the upper members and in the opening 61 at the upper end of the link. The lower end of the link has a second opening 62 which receives the shank of a pin 63 that in turn slides in the slot 47 with the head of the pin located on the opposite side of the slot from the link.

The upper and lower sections 43 and 44 are also slidably mounted with respect to each other by pins 64, the shank ends of which are received in the holes 53 on the upper member with the other ends extending through the slots 47 and terminating in heads disposed on the outside faces of the upper member. In the assembly shown in the first 6 figures the lower members 44 of the hinge are located on the outside of the upper members 43 and the links are disposed between the members. Only the heads of the pins 63 and 64 are seen in the side elevation. Preferably the link in its resting position is disposed at approximately a 45° angle from the center line of the slot 47. This provides maximum movement between the hinge members for all purposes.

In those instances where grilling or broiling operation is desired the hinge has a sliding relationship as shown in Figs. 4 and 5. In each instance the whole hinge assembly merely slides vertically to the required height. However, it will be noticed that the pin 64 is well above the ear 50, sufficiently so that the stop 55 could clear the ear 50. If the stop did clear the ear the raised portion in Fig. 2 could not be attained. To prevent this the link 42 moves the pin 63 downwardly as the top member is raised. Thus as the top member approaches a vertical position the pin has moved downwardly until it reaches the bottom of the slot and locates the upper pin 64 where the stop 55 will engage the ear 50 so that the initial 100° of movement is always under the control and limited by the stop 55.

The upper and lower elements 20 and 21 carry identical grids 66 preferably die cast of aluminum. The grids are perfectly square so that they may be received in the open mouths of the shells in any one of four ways with either face of the grids exposed. One face 67 of the grids is provided with the usual waffle contour or bosses 68 bounded by a land 70 and divided into four equal quadrants by cross lands 71.

The opposite face 74 of the grid is flat, being bounded marginally by land 75 interrupted at one corner to provide a trough-like drain 76 which has a drain lip 77 from which grease or oils will drip into a receptacle such as a saucer or cup (not shown) disposed at one corner of the device when it is used as a grill or broiler. The drain trough 76 when mounted in place can be disposed at any corner of the shell where desired. This universality of the grid and positioning of the drain trough follows from the fact that a horizontal flange 78 is provided marginally around each grid to engage and rest interchangeably upon the marginal edges of the shells 20 and 21. This flange 78 is disposed closer to the waffle face 67 than it is to the grill face 74. In fact, the flange 78 is so located that it is equidistant from the planes defined by the tops of the waffle bosses 68 and the flat face 74 of the grid.

When the device is used as a broiler the upper grid is removed as already mentioned. The lower grid is turned to have the grill side disposed upwardly and thereon is mounted a rack 134, more particularly shown in Figs. 7, 8 and 9. The rack comprises an outer or boundary wire 135 disposed inside and following close to the flange 75. Welded at their ends on this supporting wire are cross wires 136, one of which, 136a, is longer than the others and is upturned at its ends to form hook-shaped member 137 which loops over and down behind the flange 75 to hold the rack in place.

There are four wire members 138 which at one end have a similar hook-line shape 137 secured to the member 135 while at the other end the wire is bent upwardly as at 140 and outwardly as at 141 to extend over the top of the flange 75 and rest thereon. From hence the wire beyond the portion 141 is then bent upwardly as at 142 with a reverse loop 143 in the top thereof and terminates in a downwardly extending portion 144 which is welded to the wire 135 with an end 145 thereof engaging inside the flange 75.

The arrangement of the wires 138 is such that the two rearmost members 138, indicated at a and b in Fig. 7, have the loop portions 143 disposed at opposite sides from each other at a point appreciably forward of the rear edge 146 of the grid or housing. Thus the two loops 143 serve as a pivot-like support point to receive in cradled relationship the low rear marginal edges of the upper housing when the upper housing is lowered to its broiling position. Thus the rear of the housing is supported at the upper limit permitted to it by the hinge members. The other two members 138 identified by the letters c and d are disposed with their loop members at the front side of the housing where they catch and support the front lower marginal edge of the housing when it is lowered into broiling position. Thus the upright portions 142 of the rack support the upper shell member at the exact and proper point for broiling operations. The remaining portions of the rack are held in place by flange engaging members to support meat or the like on the cross wires above contact with the lower grill portion so that any liquids broiling from the food can drain freely away through the drain trough on the grid. The rack can be manipulated and carried by the loops 143.

As will be seen in Figs. 1, 2 and 4 it will be apparent that the tell-tale light is visible to the user regardless of the position the upper unit is disposed in for cooking operations, not only to apprise the user of the readiness of the device for baking operations but also whether or not the device might be hot if otherwise a person would try to investigate by touching it.

Consequently, to those skilled in the art it is apparent from the description and drawings how the objects and results are accomplished and how various and further constructions and arrangements can be made without departing from the spirit of the invention, the scope of which is commensurate with the appended claims.

What is claimed is:

1. In a device of the class described a removable rack for broiling meats under a raisable cover having a sheet metal edge and comprising a frame, cross members secured to said frame, and secondary members secured to the frame and cross members, two of said cross members and two of said secondary members being identical members having upwardly arched end portions disposed beyond the boundary of said frame, one of said end portions extending much higher than the other and having a valley in the upper portion for receiving therein in resting relationship the sheet metal edge parallel with one side of said frame in vertical alignment therewith, said higher end portions serving as handles for lifting the rack, and means on said rack serving as legs when the rack is set up on a flat surface.

2. In a device of the class described a removable rack for broiling meats under a raisable cover having a sheet metal edge and comprising a wire frame, wire cross members secured to said frame, and wire secondary members secured to the frame and cross members, two of said cross members and two of said secondary members being identical wire members having upwardly arched end portions disposed beyond the boundary of said frame, one of said end portions extending much higher than the other and having a reversely bent upper portion for receiving therein in resting relationship the sheet metal edge disposed parallel with one side of said frame in vertical alignment therewith, said higher end portions serving as loop-like handles for lifting the rack and the terminals of each end portion being bent downwardly to serve as legs for supporting the rack above a flat surface.

3. In a device of the class described, the combination of a bottom member having a grill member therein bordered by an upstanding flange; an upper housing member having downward turned sidewalls defining an opening; a secondary member mounted in said opening and supporting a heater coil within said opening above the lower edges of the sidewalls; a hinge interconnecting the two members including a hinge element having a slot and a cooperating hinge member having a pin slidable in the slot and a link pivoted to the cooperating hinge element at one side of the pin and having a pin slidable in the slot below the first pin; and a rack having elements disposed adjacent the hinge engaged by edges of said sidewalls for supporting the rear side of the upper member well above the grill, said link carrying said upper member at a height sufficient for the edges to engage said rack elements when the upper member is lowered, and elements adjacent the front engaged by the edges of said sidewalls to support the upper member in a raised and substantially level position in vertical alignment with the grill when the front portion of the upper member is fully lowered.

4. In a device of the class described, the combination of a bottom member having a grill member therein bordered by an upstanding flange, an upper housing member having downward turned sidewalls defining an opening, a secondary member mounted in said opening and supporting a heater coil within said opening above the lower edges of the sidewalls, a hinge interconnecting the two members including a hinge element having a vertical slot and a cooperating hinge element having a pintle slidable in the slot, and a rack having fulcrum elements disposed adjacent the hinge engaged by edges of said sidewalls for leverage raising the rear side of the upper member when the upper member is lowered from a raised position and like elements adjacent the front engaged by the edges of said sidewalls to support the upper member in a substantially level position at the upper limit of the hinge slot when the front portion of the upper member is fully lowered, said elements upon the racks serving as handles when the upper member is raised, said rack having protuberances engaging the upstanding flange to locate the rack and the upper member in vertical alignment when the upper member is lowered.

5. In a device of the class described, the combination of a bottom member having a grill member therein bordered by an upstanding flange, an upper housing member having downward turned sidewalls defining an opening at its edges, a secondary member mounted in said opening and supporting a heater coil within said opening above the edges of the sidewalls, a hinge interconnecting the two members including a hinge element having a vertical slot and a cooperating hinge element having a pintle slidable in the slot, means for elevating the upper hinge above its closed position when raised including a rack having fulcrum elements disposed adjacent the hinge engaged by portions of the edges of said sidewalls when the upper member is lowered from a raised position, and elements remote from the hinge engaged by other portions of the edges of said sidewalls, said elements extending above the level of the central portion of the rack to support the upper member in a raised and substantially level position when the front portion of the upper member is fully lowered.

6. In a device of the class described, the combination of a bottom member having a grill member therein bordered by an upstanding flange, an upper housing member having downward turned sidewalls defining an opening at its edges, a secondary member mounted in said opening and supporting a heater coil in said opening above the edges of the sidewalls, a hinge interconnecting the two members at the rear of the members including a hinge element having a vertical slot and a cooperating hinge element having a pintle slidable in the slot, means for elevating the upper hinge above its closed position when raised, and a rack having elements disposed adjacent to the hinge engaged by edges of said sidewalls when the upper member is lowered from a raised position, and other elements adjacent the front of the members engaged by the edges of said sidewalls, said elements extending above the central portion of the rack to support the upper member in a raised and substantially level position when the front portion of the upper member is fully lowered, said rack comprising a wire frame, wire cross members secured to said frame, and wire secondary members secured to the frame and crossmembers, two of said crossmembers and two of said secondary members constituting said elements and being identical wire members having upwardly arched end portions beyond said frame, one of said end portions extending much higher than the other and having a reversely bent upper portion for receiving therein in resting relationship the sidewall edge parallel with one side of said frame in vertical alignment therewith, said higher end portions serving as loop-like handles for lifting the rack and the terminals of each end portion being bent downwardly to serve as legs for supporting the rack above a flat surface.

7. In a device of the class described, the combination of a bottom member having a grill member therein bordered by an upstanding flange, an upper housing member having downward turned sidewalls defining an opening at its edges, a secondary member mounted in said opening and supporting a heater coil within said opening above the edges of the sidewalls, a hinge interconnecting the two members including a hinge element having a vertical slot and a cooperating hinge element having a pintle slidable in the slot, and means for elevating the upper hinge above its closed position when raised including a rack having a wire frame, wire cross members secured to said frame, and wire secondary members secured to the frame and cross members, two of said members having fulcrum elements disposed adjacent to the hinge engaged by edges of said sidewalls to raise the upper hinge when the front portion of the upper members is lowered from a raised position, and the other two members having elements adjacent the front engaged by the edges of said sidewalls, said elements extending above the central portion of the rack to support the upper member in a raised and substantially level position when the front portion of the upper member is fully lowered, said elements serving as loop-like handles for lifting the rack.

References Cited in the file of this patent

UNITED STATES PATENTS

| | | |
|---|---|---|
| 744,785 | McCaughey | Nov. 24, 1903 |
| 1,169,831 | Jeavons | Feb. 1, 1916 |
| 1,726,757 | Murphy | Sept. 3, 1929 |
| 1,837,232 | Reinhardt | Dec. 22, 1931 |
| 1,866,874 | Barnes et al. | July 12, 1932 |
| 1,874,836 | Trenner et al. | Aug. 30, 1932 |
| 2,001,285 | Rehm | May 14, 1935 |
| 2,032,175 | Jones | Feb. 25, 1936 |
| 2,135,318 | Barkinsky et al. | Nov. 1, 1938 |
| 2,188,757 | Moon | Jan. 30, 1940 |
| 2,352,292 | Schaefer | June 27, 1944 |

FOREIGN PATENTS

| | | |
|---|---|---|
| 662,604 | Germany | July 16, 1938 |